United States Patent
Na

(10) Patent No.: US 10,555,267 B2
(45) Date of Patent: Feb. 4, 2020

(54) DISTRIBUTED ANTENNA SYSTEM AND SIGNAL PROCESSING METHOD THEREOF

(71) Applicant: SOLiD, INC., Seongnam-si, Gyeonggi-do (KR)

(72) Inventor: Bongcheol Na, Anyang-si (KR)

(73) Assignee: SOLiD, INC., Seongnam-si (KR)

( * ) Notice: Subject to any disclaimer, the term of this patent is extended or adjusted under 35 U.S.C. 154(b) by 136 days.

(21) Appl. No.: 15/421,637

(22) Filed: Feb. 1, 2017

(65) Prior Publication Data

US 2017/0303209 A1    Oct. 19, 2017

(30) Foreign Application Priority Data

Apr. 13, 2016  (KR) .......................... 10-2016-0045234

(51) Int. Cl.
*H04W 52/26* (2009.01)
*H04W 52/42* (2009.01)
*H04W 88/08* (2009.01)

(52) U.S. Cl.
CPC ............ *H04W 52/26* (2013.01); *H04W 52/42* (2013.01); *H04W 88/08* (2013.01)

(58) Field of Classification Search
CPC ..... H04W 52/26; H04W 52/42; H04W 88/08; H04W 88/085; H04W 92/12
See application file for complete search history.

(56) References Cited

U.S. PATENT DOCUMENTS

| | | | | |
|---|---|---|---|---|
| 6,788,661 B1* | 9/2004 | Ylitalo | ................. | H04B 7/0617 342/359 |
| 6,801,767 B1* | 10/2004 | Schwartz | ......... | H04B 10/25755 398/115 |
| 7,848,731 B1* | 12/2010 | Dianda | .................... | H04B 3/54 370/466 |
| 9,973,933 B2* | 5/2018 | Mueck | .................. | H04W 16/14 |
| 2002/0012326 A1* | 1/2002 | Chang | ................... | H04W 52/54 370/318 |
| 2002/0075562 A1* | 6/2002 | Youn | .................... | H01S 3/06754 359/341.41 |
| 2003/0114165 A1* | 6/2003 | Mills | ..................... | H04W 16/06 455/453 |
| 2003/0130002 A1* | 7/2003 | Chen | ..................... | H04W 52/50 455/522 |
| 2003/0223360 A1* | 12/2003 | Yamazaki | ............. | H04W 28/06 370/229 |
| 2006/0040619 A1* | 2/2006 | Cho | ....................... | H04W 52/08 455/69 |

(Continued)

*Primary Examiner* — Dung B Huynh
(74) *Attorney, Agent, or Firm* — Sughrue Mion, PLLC

(57) ABSTRACT

According to an aspect of the inventive concept, there is provided a headend apparatus, including: a spectrum analysis unit analyzing frequency spectrums of a plurality of base station signals to detect characteristic information of the plurality of base station signals; a control unit transmitting the characteristic information to a network management server connected to the headend apparatus and outputting power control information, generated based on the characteristic information, received from the network management server; and a plurality of RF units receiving at least one of the plurality of base station signals and controlling power of the plurality of base station signals based on the power control information and outputting the plurality of base station signals.

13 Claims, 4 Drawing Sheets

(56) References Cited

U.S. PATENT DOCUMENTS

| | | | |
|---|---|---|---|
| 2007/0264009 A1* | 11/2007 | Sabat, Jr. | H04B 10/25752 398/5 |
| 2008/0064403 A1* | 3/2008 | Take | H04W 36/0083 455/436 |
| 2010/0048163 A1* | 2/2010 | Parr | H04W 64/00 455/404.2 |
| 2011/0032888 A1* | 2/2011 | Matsumoto | H04L 5/0051 370/329 |
| 2011/0098076 A1* | 4/2011 | Kim | H04W 52/12 455/522 |
| 2012/0087426 A1* | 4/2012 | Zhang | H04L 1/0693 375/260 |
| 2012/0307756 A1* | 12/2012 | Collings | H04W 16/02 370/329 |
| 2013/0017863 A1* | 1/2013 | Kummetz | H04W 16/04 455/562.1 |
| 2013/0071112 A1* | 3/2013 | Melester | H04B 17/0085 398/38 |
| 2014/0098731 A1* | 4/2014 | Maaref | H04W 72/121 370/312 |
| 2014/0219255 A1* | 8/2014 | Eyuboglu | H04W 72/12 370/336 |
| 2014/0233435 A1* | 8/2014 | Ko | H04W 88/085 370/277 |
| 2015/0016441 A1* | 1/2015 | Hanson | H04W 16/02 370/338 |
| 2016/0135199 A1* | 5/2016 | Wang | H04W 74/0816 455/450 |
| 2016/0315706 A1* | 10/2016 | Yeo | H04B 10/25753 |
| 2017/0026093 A1* | 1/2017 | Kim | H04B 7/0452 |
| 2017/0064642 A1* | 3/2017 | Tarlazzi | H04B 17/19 |
| 2017/0070975 A1* | 3/2017 | Ranson | H04B 7/15507 |
| 2017/0215153 A1* | 7/2017 | Yeo | H04B 17/327 |
| 2017/0288716 A1* | 10/2017 | Daniel | H04B 1/12 |
| 2018/0049198 A1* | 2/2018 | Viger | H04W 74/0816 |
| 2018/0069741 A1* | 3/2018 | Kummetz | H04B 7/155 |
| 2018/0206197 A1* | 7/2018 | Daniel | H04B 7/0426 |
| 2018/0338335 A1* | 11/2018 | Mukherjee | H04L 5/001 |

* cited by examiner

DISTRIBUTED ANTENNA SYSTEM AND SIGNAL PROCESSING METHOD THEREOF

CROSS REFERENCE TO RELATED APPLICATION

This application claims priority from Korean Patent Application No. 10-2016-0045234, filed on Apr. 13, 2016, in the Korean Intellectual Property Office, the contents of which is incorporated herein by reference in its entirety.

BACKGROUND

1. Field

The inventive concept relates to a distributed antenna system and a signal processing method thereof, and more particularly, to a distributed antenna system and a signal processing method thereof, which can efficiently manage limited transmission resources of the distributed antenna system.

2. Description of Related Art

In general, with the development of mobile communication, use patterns and demands of users are also diversified, and as a result, the users desire communication without a limit in time and space. However, an output power of a base station is limited and a shadow area is present due to a problem such as a position or a geographical feature of the base station and as a scheme for resolving the shadow area, a distributed antenna system is used.

The distributed antenna system includes a headend apparatus coupled to the base station and a remote apparatus coupled to the headend apparatus through an optical cable and the distributed antenna system is installed in an area where a radio frequency signal is not received or receiving the radio frequency signal is weak, such as the inside of a building, an underground of the building, a subway, a tunnel, apartment complex of a residential area, and the like and is used in terms of coverage expansion of the base station so as to expand the service to the shadow area which a signal of the base station is difficult to reach.

When a case of a downlink among the services provided by the distributed antenna system is described as an example, the headend apparatus combines signals received from the base station and thereafter, converts the combined signals into an optical signal and transmits the optical signal to the remote apparatus and the remote apparatus restores the received optical signal to an original signal and amplifies the restored signal and transmits the amplified signal to a terminal.

In this case, a service having more improved quality may be provided as a signal-to-noise ratio (SNR) of the optical transmitted from the headend apparatus to the remote apparatus is higher and since there is a limit in increasing power of the signal in order to enhance the SNR, a power level of the signal, that is, transmission resources are limited. As a result, a distributed antenna system providing a multi-band service has a problem in that the transmission resources need to be appropriately distributed for each base station signal so as to transmit each of base station signals with optimized power when various base station signals are combined to be transmitted as the optical signal.

In the distributed antenna system in the related art, a technician directly distributes the limited transmission resources by a method of analyzing signals input into the distributed antenna system by using a measurer and thereafter, controlling attenuation for each signal. However, in the related art, since there are a lot of cases in which the transmission resource distribution optimization of the distributed antenna system is repeatedly performed according to a capability of a field technician, there is a problem in that a lot of manpower and time are required.

SUMMARY

The inventive concept is directed to optimize and distribute transmission resources of the distributed antenna system and promote convenience of a manager.

Additional aspects will be set forth in part in the description which follows and, in part, will be apparent from the description, or may be learned by practice of the presented embodiments.

According to an aspect of the inventive concept, there is provided a headend apparatus, including: a spectrum analysis unit analyzing frequency spectrums of a plurality of base station signals to detect characteristic information of the plurality of base station signals; a control unit transmitting the characteristic information to a network management server connected to the headend apparatus and outputting power control information, generated based on the characteristic information, received from the network management server; and a plurality of RF units receiving at least one of the plurality of base station signals and controlling power of the plurality of base station signals based on the power control information and outputting the plurality of base station signals.

According to an exemplary embodiment, the characteristic information may include bandwidth information of the plurality of base station signals, and the network management server may generate the power control information based on the bandwidth information of the plurality of base station signals.

According to an exemplary embodiment, the network management server may calculate a proportional relationship among bandwidths of the plurality of base station signals, and the network management server may generate the power control information so that the power of the plurality of base station signals corresponds to the calculated proportional relationship among the bandwidths.

According to an exemplary embodiment, the power control information may be information for controlling power of other base station signals so as to correspond to a power level of a base station signal having a minimum bandwidth among the plurality of base station signals.

According to an exemplary embodiment, the characteristic information may include input power information and channel number information of the plurality of base station signals, and the network management server may generate the power control information for controlling the power of the plurality of base station signals based on input power information and channel number information of the plurality of base station signals.

According to an exemplary embodiment, the network management server may calculate a normalized coefficient by using a value acquired by adding input powers of the plurality of respective base station signals and a value acquired by adding channel numbers of the plurality of respective base station signals, the network management server may calculate a power adjustment value for each of the plurality of base station signals by using the normalized coefficient, and the network management server may generate the power control information for controlling the power of the plurality of base station signals so as to correspond to the power adjustment value.

According to an exemplary embodiment, each of the plurality of RF units may include an attenuator controlling the power of the received base station signal according to the power control information.

According to an exemplary embodiment, the headend apparatus may further include a combination/distribution unit receiving and combining base station signals of which power is controlled, which are output from the plurality of RF units; and at least one optical unit receiving the combined base station signal output from the combination/distribution unit and converting the combined base station signal into an optical signal and outputting the optical signal.

According to another aspect of the inventive concept, there is provided a distributed antenna system, including: a first base station interface unit analyzing frequency spectrums of a plurality of first base station signals received from a plurality of base stations connected thereto to detect first characteristic information, transmitting the first characteristic information, receiving combination power control information received to correspond to transmission of the first characteristic information, and controlling power of the first base station signals by using the combination power control information; a second base station interface unit analyzing frequency spectrums of a plurality of second base station signals received from at least one base station connected thereto to detect second characteristic information, transmitting the second characteristic information, receiving the combination power control information received to correspond to transmission of the second characteristic information, and controlling power of the second base station signal by using the combination power control information; and a network management server generating the combination power control information for controlling the power of the first base station signals and the second base station signal based on the first characteristic information and the second characteristic information and transmitting the combination power control information to the first and second base station interface units.

According to an exemplary embodiment, the first characteristic information and the second characteristic information may include bandwidth information of the plurality of base station signals, and the network management server may generate the combination power control information based on bandwidth information of the first and second base station signals.

According to an exemplary embodiment, the network management server may calculate a proportional relationship among bandwidths of all of the first base station signals and the second base station signal, and the network management server may generate the combination power control information so that the power of the first base station signals and the second base station signal corresponds to the proportional relationship among the bandwidths.

According to an exemplary embodiment, the combination power control information may be information for controlling power of other base station signals so as to correspond to a power level of a base station signal having a minimum bandwidth among the first base station signals and the second base station.

According to an exemplary embodiment, the first characteristic information may include first input power information and first channel number information of the first base station signals, the second characteristic information may include second input power information and second channel number information of the second base station signals, and the network management server may generate the combination power control information based on the first input power information, the first channel number information, the second input power information, and the second channel number information.

According to an exemplary embodiment, the network management server may calculate a normalized coefficient by using a value acquired by adding the first input power information and the second input power information and a value acquired by adding the first channel number information and the second channel number information, the network management server may calculates a power adjustment value for each of the first base station signals and the second base station signal by using the normalized coefficient, and the network management server may generate the combination power control information for controlling the power of the first base station signals and the second base station so as to correspond to the power adjustment value.

According to an exemplary embodiment, the distributed antenna system may further include a combination unit combining and outputting a first combination signal received from the first base station interface unit and a second combination signal received from the second base station interface unit, the first base station interface unit may combine the first base station signals of which the power is controlled to generate the first combination signal, and the second base station interface unit may combine the second base station signal of which the power is controlled to generate the second combination signal.

According to an exemplary embodiment, the distributed antenna system may further include an optical unit converting a signal input from the combination unit into an optical signal and transmitting the optical signal to a connected remote unit.

According to yet another aspect of the inventive concept, there is provided a distributed antenna system, including: a first base station interface unit analyzing frequency spectrums of a plurality of first base station signals received from a plurality of base stations connected thereto to detect first characteristic information, transmitting the first characteristic information, receiving first combination power control information to correspond to transmission of the first characteristic information, and controlling power of the first base station signals by using the first combination power control information; a second base station interface unit analyzing frequency spectrums of a plurality of second base station signals received from at least one base station connected thereto to detect second characteristic information, transmitting the second characteristic information, receiving second combination power control information to correspond to transmission of the second characteristic information, and controlling power of the second base station signal by using the second combination power control information; and a network management server generating the first combination power control information for controlling the power of the first base station signals and the second combination power control information for controlling the power of the second base station signal based on the first characteristic information and the second characteristic information and transmitting the first combination power control information to the first base station interface unit and transmitting the second combination power control information to the second base station interface unit.

According to exemplary embodiments of the inventive concept, a distributed antenna system and a signal processing method thereof can fairly distribute limited transmission resources to respective base station signals with efficiency and promote convenience of a manager by controlling power of the base station signals according to characteristics of the base station signals without intervention of the manager.

BRIEF DESCRIPTION OF FIGURES

Exemplary embodiments of the inventive concept will be more clearly understood from the following detailed description taken in conjunction with the accompanying drawings in which.

DETAILED DESCRIPTION OF THE EXEMPLARY EMBODIMENTS

Figure 1:
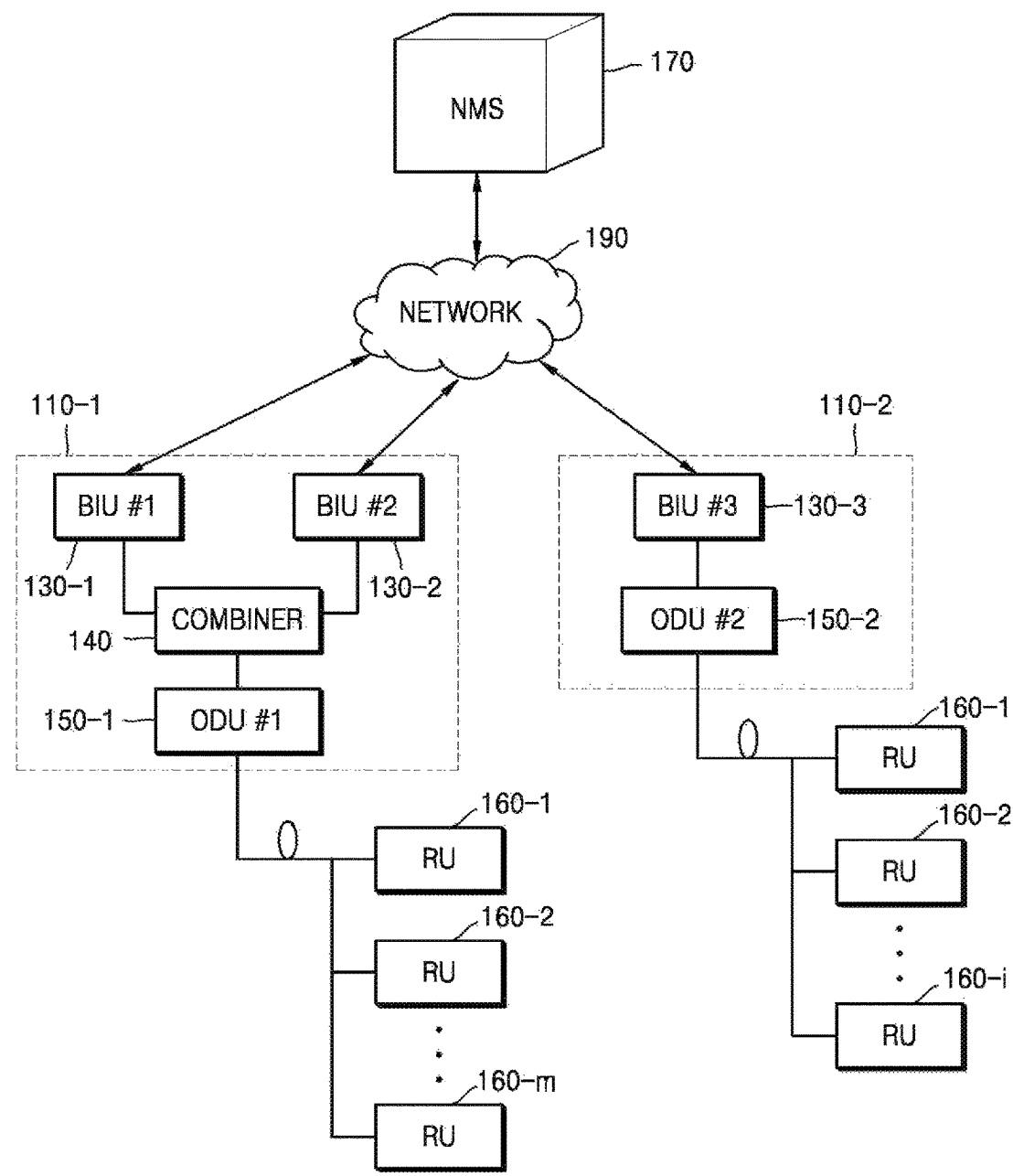
FIG. 1 is a configuration diagram of a distributed antenna system according to an exemplary embodiment of the inventive concept.

The inventive concept may be variously modified and have various exemplary embodiments, so that specific embodiments will be illustrated in the drawings and described in the detailed description. However, this does not limit the inventive concept to specific exemplary embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "coupled" the other component, it is understood that the one component may be directly connected to or may directly access the other component but unless explicitly described to the contrary, another component may be "connected" or "coupled" between the components.

In addition, terms including "unit", "er", "or", "module", and the like disclosed in the specification mean a unit that processes at least one function or operation and this may be implemented by hardware or software such as a processor, a microprocessor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software.

Moreover, it is intended to be clarified that distinguishing components in the specification just distinguishing the components for each primary function which each component takes charge of. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

A distributed antenna system according to an exemplary embodiment of the inventive concept is a coverage system for an in-building service that transfers voice communication and data communication with high quality and through a seamless access. Further, an analog and digital telephone system that provides a service in multiple bands is a system for providing the service by using one antenna.

The distributed antenna system according to the exemplary embodiment of the inventive concept may be primarily installed in general public institutions and private facilities such as a shopping mall, a hotel, a campus, an airport, a hospital, a subway, a sports complex, a convention center, and the like.

The distributed antenna system according to the exemplary embodiment of the inventive concept enhances a poor propagation environment in a building, enhances received signal strength indication (RSSI) and chip energy/others interference (Ec/Io) which is total reception sensitivity of a mobile terminal, and provides a service of mobile communication throughout the building to allow a communication service user to arbitrarily take a call even anywhere in the building.

The distributed antenna system according to the exemplary embodiment of the inventive concept may support a mobile communication standard used globally. For example, the distributed antenna system may support frequencies such as Very High Frequency (VHF), Ultra High Frequency (UHF), 700 MHz, 800 MHz, 850 MHz, 900 MHz, 1900 MHz, 2100 MHz band, 2600 MHz band, and the like and a TDD type service in addition to an FDD type service. In addition, the distributed antenna system may support an analog representative mobile communication service (advanced mobile phone service (AMPS)) and multiple mobile communication standards including time-division multiplexing access (TDMA), code division multiple access (CDMA), wideband code division multiple access (WCDMA), high speed downlink packet access (HSDPA), long term evolution (LTE), long term evolution advanced (LTE-A), and the like.

Hereinafter, exemplary embodiments of the inventive concept will be sequentially described in detail.

FIG. 1 is a configuration diagram of a distributed antenna system according to an exemplary embodiment of the inventive concept.

Referring to FIG. 1, the distributed antenna system according to the exemplary embodiment of the inventive concept may include n headend apparatuses (herein, n is a natural number of 2 or more) including a first headend apparatus (HE#1) 110-1, a second headend apparatus (HE#2) 110-2, and the like, a network management server (NMS) 170, and m remote units (RUs) 160-1 to 160-$m$ (herein, m is the natural number of 2 or more) and i remote units (RUs) 160-1 to 160-$i$ (herein, i is the natural number of 2 or more). Herein, n headend apparatuses 110-1, 110-2 . . . 110-$n$ and the network management server 170 may be connected through a network 150. The network 150 may adopt communication networks which connect n headend apparatuses 110-1, 110-2 . . . 110-$n$ and the network management server 170 to transmit/receive various information to/from each other, such as Internet, Intranet, a wireless communication network, and the like regardless of types of the communication networks.

First, the n-th headend apparatus 110-n may be connected to a plurality of base stations (not shown) through a predetermined transmission medium, for example, a coaxial cable, and the like. In another exemplary embodiment, the n-th headend apparatus 110-n may be wirelessly connected to the plurality of base stations.

Further, the n-th headend apparatus 110-n may receive base station signals from the plurality of respective base stations. In addition, the n-th headend apparatus 110-n may detect characteristic information by analyzing the received plurality of respective base station signals and transmit the detected characteristic information to a network transmission server 170. Further, the n-th headend apparatus 110-n may control power of the plurality of respective base station signals by using power control information (this will be described below) received from the network management server 170. Moreover, the n-th headend apparatus 110-n may combine and transmit the plurality of base station signals of which the power is controlled to connected apparatus (for example, a plurality of remote units 160-1 to 160-m or 160-1 to 160-i).

For example, the n-th headend apparatus 110-n may combine the plurality of base station signals (hereinafter, referred to as a 'combination signal') and convert the combination signal into an optical signal and thereafter, the optical signal to the plurality of remote units. In FIG. 1, a case in which the first headend apparatus 110-1 includes a first base station interface unit 130-1, a second base station interface unit 130-2, a combination unit (combiner) 140, and a first optical unit 150-1 is illustrated. When the number of base stations which are connectable to the first base station interface unit 130-1 is exceeded, the first headend apparatus 110-1 may extend the number of base stations connectable by adding the second base station interface unit 130-2.

In this case, the first base station interface unit 130-1 may receive a base station signal (hereinafter, referred to as 'first base station signal's for distinguishment from a base station signal received by the second base station interface unit 130-2) from the plurality of base stations and control power of the received first base station signals by using the power control information. Further, the second base station interface unit 130-2 may receive a base station signal (hereinafter, referred to as a 'second base station signal' for distinguishment from the base station signal received by the first base station interface unit 130-1) from one or more base stations and control power of the received second base station signal by using the power control information.

Thereafter, the first base station interface unit 130-1 may generate a first combination signal by combining the first base station signals of which the power is controlled and output the first combination signal to the combination unit 140. Further, the second base station interface unit 130-2 may generate a second combination signal by combining the second base station signal of which the power is controlled and output the second combination signal to the combination unit 140. The combination unit 140 combines the first combination signal and the second combination signal to output the combined signals to the first optical unit 150-1. The first optical unit 150-1 may convert the signal input from the combination unit 140 into the optical signal and thereafter, transmit the optical signal to the plurality of connected remote units 160-1 to 160-m.

Meanwhile, in FIG. 1, a case in which the second headend apparatus 110-2 includes a third base station interface unit 130-3 and a second optical unit 150-2 is illustrated. The third base station interface unit 130-3 may receive the base station signals from the plurality of base stations and control the power of the received base station signals by using the power control information. Further, the third base station interface unit 130-3 may combine the base station signals of which the power is controlled and output the combined base station signals to the second optical unit 150-2. The second optical unit 150-2 may convert the signal input from the third base station interface unit 130-3 into the optical signal and thereafter, transmit the optical signal to the plurality of connected remote units 160-1 to 160-i.

Further, the network management server 170 may generate the power control information according to a predetermined method based on the characteristic information received from the n-th headend apparatus 110-n. Herein, the power control information may be information for the n-th headend apparatus 110-n to control the power of the plurality of base station signals. Further, the network management server 170 may transmit the generated power control information to the n-th headend apparatus 110-n.

Meanwhile, the combination unit 140 may receive a signal (hereinafter, referred to as 'other signal') from other apparatus, for example, the second headend apparatus 110-2. The combination unit 140 may combine the combination signal received from the first base station interface unit 130-1 and the second base station interface unit 130-2 and the other signal received from the third base station interface unit 130-3 of the second headend apparatus 110-2. The combination unit 140 may transmit the combined signal to the first optical unit 150-1.

Hereinafter, an operation in which the n-th headend apparatus 110-n generates the characteristic information of the plurality of base station signals, an operation in which the network management server 170 generates the power control information by using the characteristic information, and the like according to an exemplary embodiment of the inventive concept will be described in more detail with reference to FIGS. 2 to 4.

Figure 2:
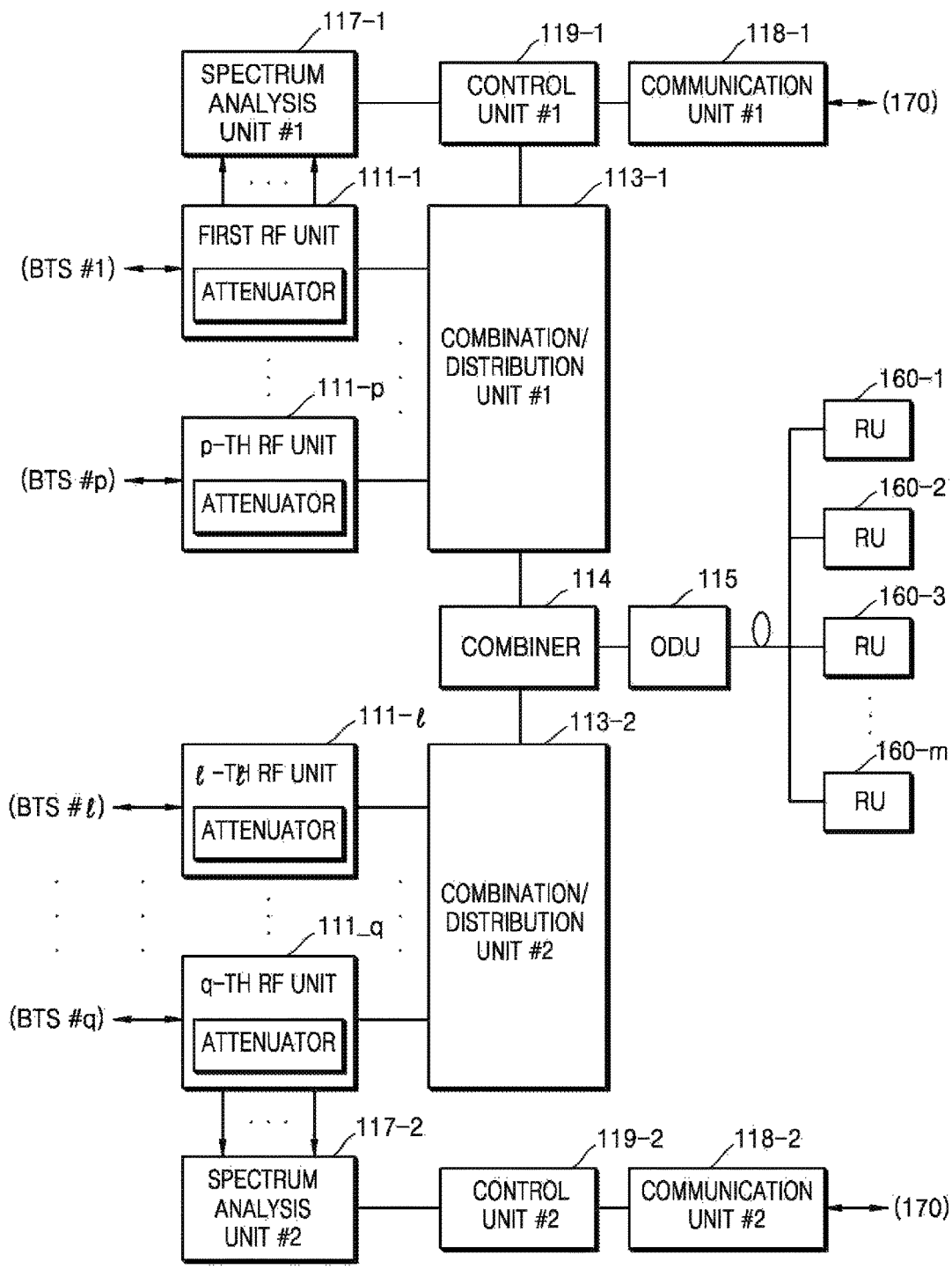
FIG. 2 is a block diagram schematically illustrating a distributed antenna system according to an exemplary embodiment of the inventive concept.

FIG. 2 is a block diagram schematically illustrating a distributed antenna system according to an exemplary embodiment of the inventive concept.

The distributed antenna system illustrated in FIG. 2 is configured on the basis of the first headend apparatus 110-1 of FIG. 1. The first headend apparatus 110-1 may include the first base station interface unit 130-1 and the second base station interface unit 130-2 and each base station interface unit may include a plurality of RF units, combination/distribution units, spectrum analysis units, control units, and communication units. For example, the first base station interface unit 130-1 may include a first RF unit 111-1 to a p-th RF unit 111-p (however, p is the natural number of 2 or more), a first combination/distribution unit 113-1, a first spectrum analysis unit 117-1, a first control unit 119-1, and a first communication unit 118-1. Further, the second base station interface unit 130-2 may include a 1-th RF unit 111-1 (however, 1 is a natural number more than p) to a q-th RF unit 111-q (however, q is a natural number more than 1), a second combination/distribution unit 113-2, a second spectrum analysis unit 117-2, a second control unit 119-2, and a second communication unit 118-2.

Prior to describing, in detail, the distributed antenna system illustrated in FIG. 2, first, an overall operation of the n-th headend apparatus 110-n according to an exemplary embodiment of the inventive concept will be schematically described and thereafter, a detailed operation of each component will be described.

The n-th headend apparatus 110-n may be connected with a plurality of base stations BTS through the predetermined transmission medium, for example, the coaxial cable, and the like. In another exemplary embodiment, the n-th headend apparatus 110-n may be wirelessly coupled the plurality of base stations.

The n-th headend apparatus 110-n may receive base station signals from the plurality of respective base stations. Herein, the plurality of base stations may provide RF type base station signals to the n-th headend apparatus 110-n, but the technical spirit of the inventive concept is not limited thereto. In another exemplary embodiment, at least some of the plurality of base stations may provide a digital type base station signal to the n-th headend apparatus 110-n and in this case, the first headend apparatus 110-1 may include an interfacing unit for converting the digital type base station signal into the RF type base station signal. The base station signal may have a specific frequency band according to a service provided by each base station.

The n-th headend apparatus 110-n may include the spectrum analysis unit. The spectrum analysis unit analyzes frequency spectrums of the base station signals to detect the characteristic information for the respective base station signals. The characteristic information may include, for example, bandwidth information, channel number information, input power information, and the like of the base station signals.

The n-th headend apparatus 110-n may transmit the characteristic information detected by the spectrum analysis unit to the network management server 170. The network management server 170 may generate the power control information for controlling the power of the respective base station signals by using the characteristic information received from the n-th headend apparatus 110-n. Further, the network management server 170 may transmit the generated power control information to the n-th headend apparatus 110-n. The n-th headend apparatus 110-n may control the power of the respective base station signals by using the power control information. Further, the n-th headend apparatus 110-n may combine the base station signals of which the power is controlled and convert the combined base station signals into the optical signal. A detailed configuration and a detailed method for signal processing such as the power control of the base station signals of the n-th headend apparatus 110-n and the network management server 170, and the like will be hereinafter described in more detail.

The n-th headend apparatus 110-n may be coupled to a plurality of remote apparatus, for example, the first to m-th remote units 160-1 to 160-m through the transmission medium such as the optical cable, and the like. The n-th headend apparatus 110-n may transmit the optical signal to each of the first to m-th remote units 160-1 to 160-m through the corresponding transmission medium. In another exemplary embodiment, the n-th headend apparatus 110-n may be connected with an expansion apparatus (not illustrated) through the transmission medium, for example, the optical cable and transmit the optical signal to the expansion apparatus through the transmission medium. For example, the expansion apparatus may transmit the optical signal received from the n-th headend apparatus 110-n to some remote units coupled through the optical cable.

The first to m-th remote units 160-1 to 160-m may restore the received optical signal to original base station signals and amplify the restored base station signals and transmit the amplified base station signals through an antenna (not illustrated). The first to m-th remote units 160-1 to 160-m may be connected with an optical unit 115 of the n-th headend apparatus 110-n for each group and receive the optical signal from the optical unit corresponding for each group.

As described above, in the distributed antenna system according to the exemplary embodiment of the inventive concept, the n-th headend apparatus 110-n may directly control the power based on characteristics of the plurality of base station signals and combine the base station signals of which the power is controlled and thereafter, convert the combined base station signals into the optical signal and transmit the optical signal to the plurality of remote units. As a result, in the distributed antenna system according to the exemplary embodiment of the inventive concept, limited transmission resources of the n-th headend apparatus 110-n may be fairly distributed according to the characteristics of the plurality of respective base station signals without intervention by a manager, and as a result, efficient distribution of the transmission resources and convenience of the manager may be promoted.

Meanwhile, the first headend apparatus 110-1 may combine the first base station signal of which the power is controlled and output the combined first base station signal to a combination unit 114 and combine the second base station signal of which the power is controlled and output the combined second base station signal to the combination unit 114, the combination unit 114 may combine the first base station signals and the second base station signal which are combined and received, and an optical unit 115 may convert the combined base station signals into the optical signal and thereafter, transmit the optical signal to the connected remote units as described above through FIG. 1. Hereinafter, respective components of the first headend apparatus 110-1 will be described in detail.

First, each of the first to p-th RF units 111-1 to 111-p may receive the base station signal from the corresponding base station among the first to p-th base stations BTS #1 to BTS #p. However, the inventive concept is not limited thereto and in another exemplary embodiment, at least one RF unit of the first to p-th RF units 111-1 to 111-p may receive base station signals from at least two base stations among the first to p-th base stations BTS #1 to BTS #p. Hereinafter, the plurality of base station signals received through the first to p-th RF units 111-1 to 111-p are described by being collectively called the first base station signals.

Further, each of the 1-th to q-th RF units 111-1 to 111-q may receive the base station signal from the corresponding base station among the 1-th to q-th base stations BTS #1 to BTS #q. However, the inventive concept is not limited thereto and in another exemplary embodiment, at least one RF unit of the 1-th to q-th RF units 111-1 to 111-q may receive base station signals from at least two base stations among the 1-th to q-th base stations BTS #1 to BTS #q. Hereinafter, one or more base station signals received through the 1-th to q-th RF units 111-1 to 111-q are described by being collectively called the second base station signal.

Herein, the 1-th to q-th RF units 111-1 to 111-q are components of the second base station interface unit 130-2 and since the second base station interface unit 130-2 may be a unit added when the number of base stations connectable to the first base station interface unit 130-1 is exceeded, the second base station signal may be a signal received from one base station. On the contrary, when the second base station interface unit 130-2 is added, the base station signal received by the first base station interface unit 130-1 will be a plurality of signals.

Further, the first to q-th RF units 111-1 to 111-q may include an attenuator ATT that controls the power of the base station signal. The attenuator ATT may control the power of the base station signal in response to the power control information provided from the first control unit 119-1 or the second control unit 119-2. Meanwhile, the first headend unit 110-1 may include the plurality of base station interface units 130-1 and 130-2 unlike the second headend unit 110-2. Accordingly, the network management server 170 may generate the power control information by using a plurality of characteristic information received from the first headend unit 110-1 and generate the power control information by using single characteristic information received from the second headend unit 110-2. Therefore, hereinafter, the power control information generated by using the plurality of characteristic information is separately called combination power control information for distinguishment from the power control information generated by using the single characteristic information.

For example, the first control unit 119-1 may transmit first characteristic information input from the first spectrum analysis unit 117-1 to the network management server 170 and output the combination power control information received from the network management server 170 (corresponding to transmission of the first characteristic information) to the attenuator ATT. For example, the second control unit 119-2 may transmit second characteristic information input from the second spectrum analysis unit 117-2 to the network management server 170 and output the combination power control information received from the network management server 170 (corresponding to transmission of the second characteristic information) to the attenuator ATT.

The first combination/distribution unit 113-1 combines the first base station signals of which the power is controlled, which are output from the first to p-th RF units 111-1 to 111-$p$ to generate the first combination signal. The first combination/distribution unit 113-1 may distribute the first combination signal to the combination unit 114. The second combination/distribution unit 113-2 combines the second base station signal of which the power is controlled, which is output from the 1-th to q-th RF units 111-1 to 111-$q$ to generate the second combination signal. The second combination/distribution unit 113-2 may distribute the second combination signal to the combination unit 114.

The combination unit 114 combines the first combination signal and the second combination signal to output the combined signals to the optical unit 150. Herein, an operation in which the combination unit 114 combines the first combination signal and the second combination signal may be diversified and since a detailed method thereof has already been known, detailed description thereof will be omitted.

The optical unit 115 may convert the signal input from the combination unit 114 into the optical signal and output the optical signal. That is, the optical unit 115 may transmit the optical signal to the remote units 160-1 to 160-$m$ through the corresponding transmissions medium.

The first spectrum analysis unit 117-1 may receive the first base station signals and analyzes the frequency spectrums of the received first base station signals to detect the first characteristic information. Further, the second spectrum analysis unit 117-2 may receive the second base station signal and analyzes the frequency spectrum of the received second base station signal to detect the second characteristic information.

In some exemplary embodiments, the first spectrum analysis unit 117-1 is connected with input terminals of the respective first to p-th RF units 111-1 to 111-$p$ connected with the corresponding base station among the first to p-th base stations BTS #1 to BTS #p to receive the first base station signals input into the first to p-th RF units 111-1 to 111-$p$ and analyzes the frequency spectrums of the received first base station signals to detect the first characteristic information. Further, the second spectrum analysis unit 117-2 is connected with input terminals of the respective 1-th to q-th RF units 111-1 to 111-$q$ connected with the corresponding base station among the 1-th to q-th base stations BTS #1 to BTS #q to receive the second base station signals input into the 1-th to q-th RF units 111-1 to 111-$q$ and analyzes the frequency spectrums of the receive second base station signal to detect the second characteristic information.

However, the inventive concept is not limited thereto. In another exemplary embodiment, the first spectrum analysis unit 117-1 is connected with output terminals of the respective first to p-th RF units 111-1 to 111-$p$ connected with the first combination/distribution unit 113-1 to receive the first base station signals output from the first to p-th RF units 111-1 to 111-$p$ and analyze the frequency spectrums of the received first base station signals. In this case, the first spectrum analysis unit 117-1 analyzes the frequency spectrums of the base station signals output from the first to p-th RF units 111-1 to 111-$p$ to detect the first characteristic information based on information on base station signal processing of the RF unit, which is provided from the first control unit 119-1, for example, information on a power control result, and the like. Similarly, the second spectrum analysis unit 117-2 is connected with output terminals of the respective 1-th to q-th RF units 111-1 to 111-$q$ connected with the second combination/distribution unit 113-2 to receive the second base station signal output from the 1-th to q-th RF units 111-1 to 111-$q$ and analyze the frequency spectrum of the received second base station signal.

In yet another exemplary embodiment, the first spectrum analysis unit 117-1 is not coupled to the first to p-th RF units 111-1 to 111-$p$ and may receive the base station signals from the first to p-th base stations BTS #1 to BTS #p directly or through an additional interfacing means and analyzes the frequency spectrums of the received base station signals to detect the first characteristic information. Similarly, the second spectrum analysis unit 117-2 is not coupled to the 1-th to q-th RF units 111-1 to 111-$q$ and may receive the second base station signals from the 1 to q-th base stations BTS #1 to BTS #q directly or through the additional interfacing means and analyzes the frequency spectrums of the received base station signals to detect the second characteristic information.

The first control unit 119-1 may output the first characteristic information detected by the first spectrum analysis unit 117-1 to the first communication unit 118-1 and the first communication unit 118-1 may transmit the first characteristic information to the network management server 170. Further, the second control unit 119-2 may output the second characteristic information detected by the second spectrum analysis unit 117-2 to the second communication unit 118-2 and the second communication unit 118-2 may transmit the second characteristic information to the network management server 170.

The network management server 170 may generate the combination power control information for controlling the power of the first base station signals and the second base station signal based on the first characteristic information and the second characteristic information. In this case, since the first headend unit 110-1 includes the first base station interface unit 130-1 and the second base station interface unit 130-2, the network management server 170 may recognize that the combination power control information for the first headend unit 110-1 needs to be generated by considering both the first characteristic information and the second characteristic information.

In some exemplary embodiments, the network management server 170 may generate the combination power control information based on bandwidth information of all base station signals included in the detected first characteristic information and second characteristic information. In detail, the network management server 170 may calculate a proportional relationship between bandwidths of the first base station signals and the second base station signal and generate the combination power control information so that the power of the first base station signals and the second base station signal corresponds to the calculated proportional relationship between the bandwidths. Herein, the combination power control information may be a signal for controlling power levels of other signals to correspond to a power level of a base station signal having a minimum bandwidth.

A case is further described as an example, in which the first base station signals includes a GSM signal, a CDMA signal, and a WCDMA signal and the second base station signal includes an LTE 10M signal. The GSM signal has a bandwidth of approximately 200 kHz, the CDMA signal has a bandwidth of approximately 1.23 MHz, the WCDMA signal has a bandwidth of approximately 3.84 MHz, and the LTE 10M signal has a bandwidth of approximately 9 MHz. In this case, the network management server 170 may calculate 1:6:20:45 (GSM signal:CDMA signal:WCDMA signal:LTE 10M signal) as the proportional relationship between the bandwidths of the first base station signals and the second base station signal. The network management server 170 may generate the combination power control information for the power levels of other base station signals to a power level of the GSM signal having a minimum value of the proportional relationship, that is, the minimum bandwidth so that the power of the first base station signals and the second base station signal corresponds to the calculated proportional relationship between the bandwidths.

The aforementioned exemplary embodiment is not applied only to a case in which the first base station signals and the second base station signal have a single channel and may be applied even to a case in which the first base station signals and the second base station signal have a predetermined number of channels. For example, when some or all of the first base station signals and the second base station signal have a predetermined number of channels, the aforementioned exemplary embodiment may be applied based on a unit bandwidth (that is, a bandwidth for one channel) of each of the base station signals.

In another exemplary embodiment, the network management server 170 may generate the combination power control information based on input power information and channel number information of the first base station signals and the second base station signal among the first characteristic information and the second characteristic information. In detail, the network management server 170 may calculate a normalized coefficient by using a value acquired by adding input powers of the respective first base station signals and second base station signals and a value acquired by adding channel numbers of the respective first base station signals and second base station signals. The network management server 170 may calculate a power adjustment value for each of the first base station signals and the second base station signal by using the calculated normalized coefficient, and generate the combination power control information to correspond to the calculated power adjustment value. Herein, the normalized coefficient may mean a value acquired by dividing the value acquired by adding the input powers of the respective first base station signals and second base station signals by the value acquired by adding channel numbers of the respective first base station signals and second base station signals. The power adjustment value may mean a value acquired by multiplying the input powers of the respective first base station signals and second base station signals by the normalized coefficient.

Meanwhile, the network management server 170 may use a prestored characteristic or a characteristic input by the manager in real time with respect to some base station signals in generating the combination power control information for controlling the power of the first base station signals and the second base station signal. For example, when bandwidths of some of the first base station signals and the second base station signal are similar to each other or at least some bands overlap with each other, the network management server 170 may generate the combination power control information by using the characteristic information associated with the bandwidths of the corresponding base station signals, which is prestored or input by the manger in real time.

Thereafter, the network management server 170 may transmit the generated power control information to the first and second communication units 118-1 and 118-2. The first communication unit 118-1 may output the received combination power control information to the first control unit 119-1 and the second communication unit 118-2 may output the received combination power control information to the second control unit 119-2.

The first control unit 119-1 may transmit the received combination power control information to the first to p-th RF units 111-1 to **111-*p*, and as a result, the attenuator ATT of the first to p-th RF units 111-1 to 111-*p* may control and output the power of the first base station signals. Further, the second control unit 119-2 may transmit the received combination power control information to the 1-th to q-th RF units 111-1 to 111-*q*, and as a result, the attenuator ATT of the 1-th to q-th RF units 111-1 to 111-*q*** may control and output the power of the second base station signal.

Meanwhile, in FIG. 2, the exemplary embodiment of the inventive concept is described by using as an example the case in which the n-th headend apparatus **110-*n* includes the plurality of base station interface units 130-1 and 130-2, but it is described that the n-th headend apparatus 110-*n* may include one base station interface unit 130-3 in FIG. 1, and the like. When the n-th headend apparatus 110-*n* may include one base station interface unit 130-3, the network management server 170** may generate the power control information by using the single characteristic information and since the operation of generating the power control information may be the same as or similar to the operation of generating the combination power control information, detailed description thereof may be omitted.

Hereinabove, a case has been assumed and described, in which the first base station interface unit 130-1 and the second base station interface unit 130-2 receive the same combination power control information from the network management server 170 to control the power of the base station signal by using only a part corresponding thereto among the combination power control information. A case is described, in which the combination power control information includes the power control information corresponding to both the first base station interface unit 130-1 and the second base station interface unit 130-2, the first base station interface unit 130-1 selects and uses only information corresponding to the first base station interface unit 130-1 among the combination power control information, and the second base station interface unit 130-2 selects and uses only information corresponding to the second base station interface unit 130-2 among the combination power control information.

However, the network management server 170 may be configured to allow only the information corresponding to each of the first base station interface unit 130-1 and the second base station interface unit 130-2 to be included in the combination power control information. For example, the network management server 170 generates the combination power control information by considering both the first characteristic information and the second characteristic information and selects only the information corresponding to the first base station interface unit 130-1 to generate the first combination power control information and selects only the first combination power control information corresponding to the second base station interface unit 130-2 to generate the second combination power control information. In this case, the first base station interface unit 130-1 may control the power of the first base station signals by using the first combination power control information and the second base station interface unit 130-2 may control the power of the second base station signal by using the second combination power control information.

As described above, the n-th headend apparatus 110-n may control the power of the base station signals according to characteristics of the base station signals without intervention by the manager and thereafter, combine the base station signals into one signal and optically convert the combined signal and transmit the optically converted signal to the remote apparatus. As a result, the n-th headend apparatus 110-n may fairly distribute the limited transmission resources to the respective base station signals depending on limitation of a signal-to-noise ratio (SNR) of the optical signal with efficiency and promote the convenience of the manager.

Figure 3:
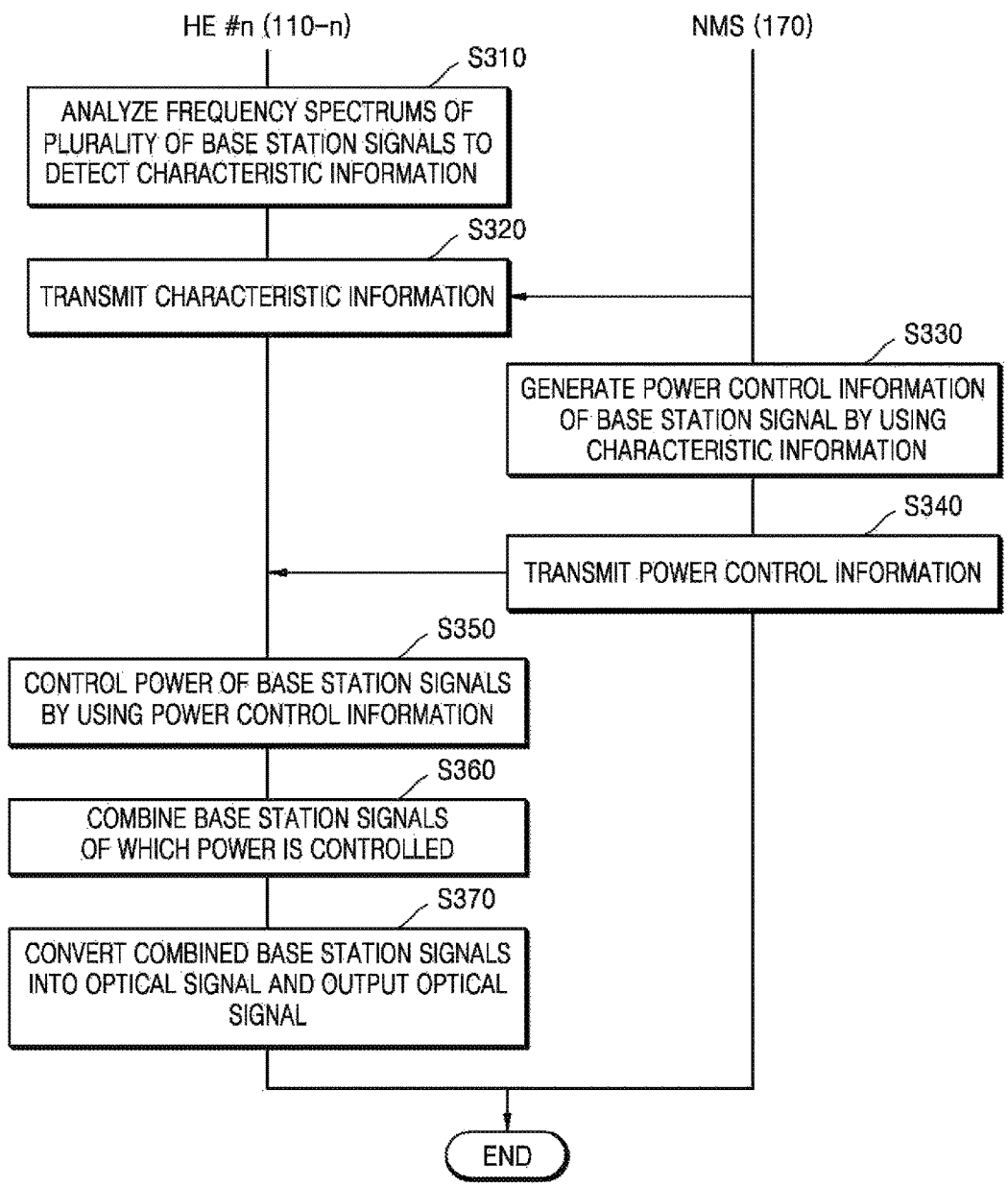
FIG. 3 is a flowchart for describing a signal processing method of a distributed antenna system according to an exemplary embodiment of the inventive concept.
Figure 4:
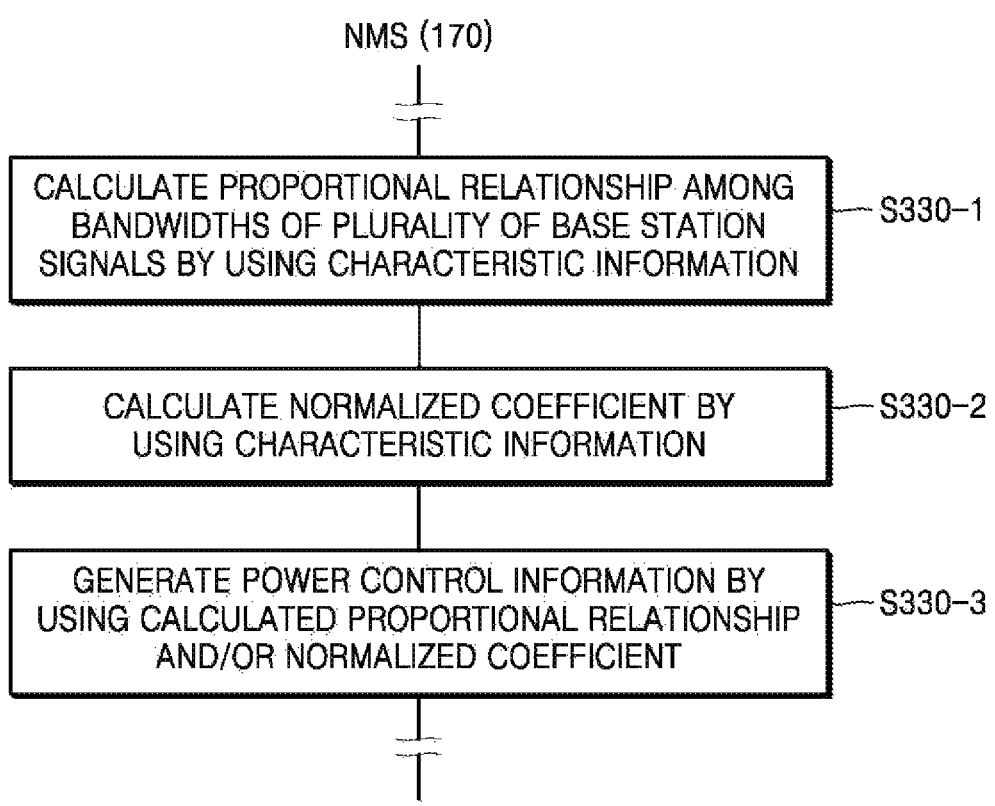
FIG. 4 is a flowchart for describing a method in which a network management server generates power control information according to an exemplary embodiment of the inventive concept.

FIG. 3 is a flowchart for describing a signal processing method of a distributed antenna system according to an exemplary embodiment of the inventive concept and FIG. 4 is a flowchart for describing a method in which a network management server generates power control information according to an exemplary embodiment of the inventive concept.

The methods illustrated in FIGS. 3 and 4 are constituted by the steps processed in the n-th headend apparatus 110-n illustrated in FIGS. 1 and 2 in time series. Therefore, it can be seen that contents regarding the n-th headend apparatus 110-n illustrated in FIGS. 1 and 2 described above may be applied even to the methods illustrated in FIGS. 3 and 4 in spite of contents omitted hereinbelow. Further, respective steps of the n-th headend unit 110-n to be described in FIG. 3 may be steps performed by the respective components of the n-th headend unit 110-n described with reference to FIG. 2, but it is collectively described that the respective steps are performed by the n-th headend unit 110-n for appreciation and easy description.

First, referring to FIG. 3, in step S310, the n-th headend unit 110-n analyzes frequency spectrums of a plurality of base station signals to detect characteristic information of the plurality of base station signals. The n-th headend unit 110-n may detect as the characteristic information at least one of bandwidths, channel numbers, and input power of the plurality of base station signals. When a plurality of base station interface units are included in the n-th headend unit 110-n, the n-th headend unit 110-n may detect a plurality of characteristic information.

In step S320, the n-th headend apparatus 110-n may transmit the detected characteristic information to a network management server 170. When the plurality of base station interface units are included in the n-th headend unit 110-n, the n-th headend unit 110-n may detect the plurality of characteristic information to the network management server 170.

In step S330, the network management server 170 may generate power control information for controlling power of a base station signal according to a predetermined method by using the received characteristic information. When the plurality of base station interface units are included in the n-th headend unit 110-n, the network management server 170 may generate combination power control information by simultaneously considering the plurality of characteristic information.

Meanwhile, referring to FIG. 4, steps in which the network management server 170 generates the power control information is described in more detail. In S330-1, the network management server 170 may calculate a proportional relationship among the bandwidths of the plurality of base station signals. When the plurality of base station interface units are included in the n-th headend unit 110-n, the network management server 170 may calculate a proportional relationship among bandwidths of all base station signals constituting the plurality of characteristic information by simultaneously considering the plurality of characteristic information.

In step S330-2, the network management server 170 may calculate a normalized coefficient by using a value acquired by adding the input powers of the plurality of respective base station signals and a value acquired by adding the channel numbers of the plurality of respective base station signals. The normalized coefficient means a value acquired by dividing the value acquired by adding the input powers of the plurality of respective base station signals by the value acquired by adding the channel numbers of the plurality of respective base station signals. When the plurality of base station interface units are included in the n-th headend unit 110-n, the network management server 170 may calculate the normalized coefficient by using a value acquired by adding channel numbers of all respective base station signals constituting the plurality of characteristic information by simultaneously considering the plurality of characteristic information.

In S330-3, the network management server 170 may generate the power control information by using the calculated proportional relationship and/or normalized coefficient. When the plurality of base station interface units are included in the n-th headend unit 110-n, the network management server 170 may generate the combination power control information by simultaneously considering the plurality of characteristic information. The network management server 170 may calculate a power adjustment value for each of the plurality of base station signals by using the normalized coefficient and generate the power control information (alternatively, combination power control information) by using the power adjustment value.

Referring back to FIG. 3, in step S340, the network management server 170 may transmit the generated power control information (alternatively, combination power control information) to the n-th headend apparatus 110-n.

In step S350, the n-th headend apparatus 110-n may control the power of the base station signals by using the received power control information (alternatively, combination power control information). For example, the n-th headend apparatus 110-n may control the power of the base station signals by using information on the proportional relationship included in the power control information. The n-th headend unit 110-n may control the power of the plurality of base station signals so that the power of the plurality of base station signals corresponds to the calculated proportional relationship among the bandwidths. In detail, the network management server 170 may generate the power control information (alternatively, combination power control information) for controlling the power of the plurality of base station signals so that the power of the plurality of base station signals corresponds to the calculated proportional relationship among the bandwidths and a plurality of RF units of the n-th headend apparatus 110-n may control and output power of a corresponding base station signal among the plurality of base station signals in response to the power control information (alternatively, combination power control information). Herein, the power control information (alternatively, combination power control information) may be a signal for controlling power of other base station signals to correspond to a power level of a base station signal having a minimum bandwidth among the plurality of base station signals.

As another example, the n-th headend apparatus 110-n may control the power of the base station signals by using the power adjustment value for the normalized coefficient included in the power control information (alternatively, combination power control information). The power adjustment value may mean a value acquired by multiplying the input power by the normalized coefficient for each of the plurality of base station signals. Therefore, the n-th headend apparatus 110-n may control the power of the plurality of base station signals so as to correspond to the power adjustment value.

In step S360, the n-th headend apparatus 110-n combines base station signals of which power is controlled to generate a combination signal. When the plurality of base station interface units are included in the n-th headend unit 110-n, the n-th headend unit 110-n may generate a plurality of combination signals and combine the plurality of combination signals through a combination unit 114.

In step S370, the n-th headend apparatus 110-n may convert the combined base station signals into an optical signal and transmit the optical signal to a plurality of remote apparatus. Alternatively, the n-th headend apparatus 110-n may convert the plurality of combination signals combined through the combination unit 114 into the optical signal and transmit the optical signal to the plurality of remote apparatus.

Hereinabove, the inventive concept has been described in detail based on the exemplary embodiment, but the inventive concept is not limited to the exemplary embodiment and various modifications and changes can be made by those skilled in the art within the scope of the inventive concept.

What is claimed is:

1. A headend apparatus, comprising at least one processor to implement:
   a spectrum analysis unit analyzing frequency spectrums of a plurality of base station signals to detect characteristic information of the plurality of base station signals;
   a control unit transmitting the characteristic information to a network management server connected to the headend apparatus and outputting power control information, generated based on the characteristic information, received from the network management server; and
   a plurality of RF units receiving at least one of the plurality of base station signals and controlling power of the plurality of base station signals based on the power control information and outputting the plurality of base station signals,
   wherein the network management server calculates a proportional relationship among bandwidths of the plurality of base station signals, and
   wherein the power control information is information for controlling power of other base station signals based on a power level of a base station signal having a minimum bandwidth among the plurality of base station signals and the calculated proportional relationship among the bandwidths.

2. The headend apparatus of claim 1, wherein the characteristic information includes bandwidth information of the plurality of base station signals, and
   wherein the network management server generates the power control information based on the bandwidth information of the plurality of base station signals.

3. The headend apparatus of claim 1, wherein the characteristic information includes input power information and channel number information of the plurality of base station signals, and
   wherein the network management server generates the power control information for controlling the power of the plurality of base station signals based on the input power information and the channel number information of the plurality of base station signals.

4. The headend apparatus of claim 3, wherein the network management server calculates a normalized coefficient by using a value acquired by adding input powers of the plurality of base station signals and a value acquired by adding channel numbers of the plurality of base station signals,
   wherein the network management server calculates a power adjustment value for each of the plurality of base station signals by using the normalized coefficient, and
   wherein the network management server generates the power control information for controlling the power of the plurality of base station signals so as to correspond to the power adjustment value.

5. The headend apparatus of claim 1, wherein each of the plurality of RF units includes an attenuator controlling the power of the received base station signal according to the power control information.

6. The headend apparatus of claim 1, wherein the at least one processor further implements:
   a combination/distribution unit receiving and combining base station signals of which power is controlled, which are output from the plurality of RF units; and
   at least one optical unit receiving the combined base station signal output from the combination/distribution unit and converting the combined base station signal into an optical signal and outputting the optical signal.

7. A distributed antenna system, comprising:
   a headend apparatus comprising at least one processor to implement:
      a first base station interface unit analyzing frequency spectrums of a plurality of first base station signals received from a plurality of base stations connected thereto to detect first characteristic information, transmitting the first characteristic information, receiving combination power control information received to correspond to transmission of the first characteristic information, and controlling power of the first base station signals by using the combination power control information; and
      a second base station interface unit analyzing frequency spectrums of a plurality of second base station signals received from at least one base station connected thereto to detect second characteristic information, transmitting the second characteristic information, receiving the combination power control information received to correspond to transmission of the second characteristic information, and controlling power of the second base station signals by using the combination power control information; and a network management server calculating a proportional relationship among bandwidths of all of the first base station signals and the second base station signals, generating the combination power control information for controlling the power of the first base station signals and the second base station signals based on the first characteristic information and the second characteristic information, and transmitting the combination power control information to the first and second base station interface units, wherein the combination power control information is information for controlling power of other base station signals based on a power level of a base station signal having a minimum bandwidth among the first base station signals and the second base station signals and the proportional relationship among the bandwidths.

8. The distributed antenna system of claim 7, wherein the first characteristic information includes bandwidth information of the plurality of first base station signals, and the second characteristic information includes bandwidth information of the plurality of second base station signals, and wherein the network management server generates the combination power control information based on the bandwidth information of the first base station signals and the bandwidth information of the second base station signals.

9. The distributed antenna system of claim 7, wherein the first characteristic information includes first input power information and first channel number information of the first base station signals, wherein the second characteristic information includes second input power information and second channel number information of the second base station signals, and wherein the network management server generates the combination power control information based on the first input power information, the first channel number information, the second input power information, and the second channel number information.

10. The distributed antenna system of claim 9, wherein the network management server calculates a normalized coefficient by using a value acquired by adding the first input power information and the second input power information and a value acquired by adding the first channel number information and the second channel number information, wherein the network management server calculates a power adjustment value for each of the first base station signals and the second base station signals by using the normalized coefficient, and wherein the network management server generates the combination power control information for controlling the power of the first base station signals and the second base station signals so as to correspond to the power adjustment value.

11. The distributed antenna system of claim 7, wherein the at least one processor further implements:

a combination unit combining and outputting a first combination signal received from the first base station interface unit and a second combination signal received from the second base station interface unit, wherein the first base station interface unit combines the first base station signals of which the power is controlled to generate the first combination signal, and wherein the second base station interface unit combines the second base station signals of which the power is controlled to generate the second combination signal.

12. The distributed antenna system of claim 11, wherein the at least one processor further implements:

an optical unit converting a signal input from the combination unit into an optical signal and transmitting the optical signal to a connected remote unit.

13. A distributed antenna system comprising:

a headend apparatus comprising at least one processor to implement:

a first base station interface unit analyzing frequency spectrums of a plurality of first base station signals received from a plurality of base stations connected thereto to detect first characteristic information, transmitting the first characteristic information, receiving first combination power control information to correspond to transmission of the first characteristic information, and controlling power of the first base station signals by using the first combination power control information; and a second base station interface unit analyzing frequency spectrums of a plurality of second base station signals received from at least one base station connected thereto to detect second characteristic information, transmitting the second characteristic information, receiving second combination power control information to correspond to transmission of the second characteristic information, and controlling power of the second base station signals by using the second combination power control information; and a network management server calculating a proportional relationship among bandwidths of the first base station signals, and calculating a proportional relationship among bandwidths o the second base station signals, generating the first combination power control information for controlling the power of the first base station signals and the second combination power control information for controlling the power of the second base station signals based on the first characteristic information and the second characteristic information, transmitting the first combination power control information to the first base station interface unit, and transmitting the second combination power control information to the second base station interface unit, wherein the first combination power control information is information for controlling power of other first base station signals based on a power level of a first base station signal having a minimum bandwidth among the first base station signals and the proportional relationship among the bandwidths of the first base station signals, and wherein the second combination power control information is information for controlling power of other second base station signals based on a power level of a second base station signal having a minimum bandwidth among the second base station signals and the proportional relationship among the bandwidths of the second base station signals.

* * * * *